(12) United States Patent
Vella et al.

(10) Patent No.: US 12,528,043 B2
(45) Date of Patent: Jan. 20, 2026

(54) SWING ADSORPTION PROCESSES AND SYSTEMS FOR CONTROLLING PRODUCT COMPOSITION

(71) Applicant: ExxonMobil Technology and Engineering Company, Spring, TX (US)

(72) Inventors: Joseph Renaldo Vella, The Woodlands, TX (US); Bennett D. Marshall, Conroe, TX (US); Chien-Chiang Chen, Spring, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 401 days.

(21) Appl. No.: 18/040,316

(22) PCT Filed: Jul. 30, 2021

(86) PCT No.: PCT/US2021/043922
§ 371 (c)(1),
(2) Date: Feb. 2, 2023

(87) PCT Pub. No.: WO2022/035617
PCT Pub. Date: Feb. 17, 2022

(65) Prior Publication Data
US 2023/0356140 A1 Nov. 9, 2023

Related U.S. Application Data

(60) Provisional application No. 63/064,541, filed on Aug. 12, 2020.

(51) Int. Cl.
| | | |
|---|---|---|
| *B01D 53/04* | (2006.01) | |
| *B01D 53/047* | (2006.01) | |
| *C10L 3/10* | (2006.01) | |

(52) U.S. Cl.
CPC ..... *B01D 53/0462* (2013.01); *B01D 53/0446* (2013.01); *C10L 3/104* (2013.01);
(Continued)

(58) Field of Classification Search
CPC ............ B01D 53/0462; B01D 53/0446; B01D 2253/108; B01D 2253/204;
(Continued)

(56) References Cited

U.S. PATENT DOCUMENTS

| | | | |
|---|---|---|---|
| 3,944,646 A | 3/1976 | Martin | |
| 4,475,929 A * | 10/1984 | Fuderer | ................ B01D 53/047 95/103 |

(Continued)

FOREIGN PATENT DOCUMENTS

WO 2019147516 A1 8/2019

*Primary Examiner* — Frank M Lawrence, Jr.
(74) *Attorney, Agent, or Firm* — ExxonMobil Technology and Engineering Company—Law Department

(57) ABSTRACT

Provided are apparatus and systems for performing a swing adsorption process. In particular, the method and system involves swing adsorption processes and systems designed to lessen the temperature, pressure and product stream composition fluctuations in the adsorption step of a swing adsorption process, particularly involving preparation of the adsorption bed unit using feed stream cooling in conjunction with splitting the cooled feed stream to the adsorption bed units during adsorption steps while staggering the timing of back-to-back adsorption steps in the swing adsorption process. The process may be utilized for swing adsorption processes, such as rapid cycle TSA and/or rapid cycle PSA, which are utilized to remove one or more contaminants from a gaseous feed stream.

20 Claims, 4 Drawing Sheets

(52) U.S. Cl.
CPC ........ *C10L 3/106* (2013.01); *B01D 2253/108* (2013.01); *B01D 2253/204* (2013.01); *B01D 2256/245* (2013.01); *B01D 2257/504* (2013.01); *B01D 2257/80* (2013.01); *B01D 2259/402* (2013.01); *B01D 2259/4061* (2013.01); *B01D 2259/4062* (2013.01)

(58) Field of Classification Search
CPC ........ B01D 2256/245; B01D 2257/504; B01D 2257/80; B01D 2259/402; B01D 2259/4061; B01D 2259/4062; B01D 2259/40022; B01D 2259/40045; B01D 2259/40064; B01D 2259/40066; B01D 2259/4009; B01D 53/0473; B01D 53/047; B01D 53/04; C10L 3/104; C10L 3/106; Y02C 20/40
USPC ...... 95/96, 97, 106, 114, 115, 117, 121–124, 95/139; 96/121
See application file for complete search history.

(56) References Cited

U.S. PATENT DOCUMENTS

| | | | |
|---|---|---|---|
| 2005/0098034 A1* | 5/2005 | Gittleman | C01B 3/56 96/121 |
| 2012/0174777 A1* | 7/2012 | Baksh | B01D 53/047 95/100 |
| 2013/0061755 A1* | 3/2013 | Frederick | B01D 53/0446 96/110 |
| 2017/0056811 A1* | 3/2017 | Nagavarapu | B01D 53/0407 |
| 2018/0065079 A1* | 3/2018 | Fitch | B01D 53/047 |

\* cited by examiner

SWING ADSORPTION PROCESSES AND SYSTEMS FOR CONTROLLING PRODUCT COMPOSITION

PRIORITY

This application is the U.S. National Stage Application of the International Application No. PCT/US2021/043922, entitled "SWING ADSORPTION PROCESSES AND SYSTEMS FOR CONTROLLING PRODUCT COMPOSITION" filed Jul. 30, 2021, which claims the benefit of U.S. Ser. No. 63/064,541, filed Aug. 12, 2020. Both of these applications are incorporated herein by reference in its entirety.

FIELD

The present techniques relate to a method and system associated with swing adsorption processes used in conditioning streams for downstream processing. In particular, the method and system involves performing swing adsorption processes to lessen the temperature, pressure and product stream composition fluctuations in the adsorption step of a swing adsorption process.

BACKGROUND

Gas separation is useful in many industries and can typically be accomplished by flowing a mixture of gases over an adsorbent material that preferentially adsorbs one or more gas components while not adsorbing one or more other gas components. The non-adsorbed components are recovered as a separate product.

One particular type of gas separation technology is swing adsorption, such as temperature swing adsorption (TSA), pressure swing adsorption (PSA), partial pressure swing adsorption (PPSA), rapid cycle temperature swing adsorption (RCTSA), rapid cycle pressure swing adsorption (RCPSA), rapid cycle partial pressure swing adsorption (RCPPSA), and not limited to but also combinations of the fore mentioned processes, such as pressure and temperature swing adsorption. As an example, PSA processes rely on the phenomenon of gases being more readily adsorbed within the pore structure or free volume of an adsorbent material when the gas is under pressure. That is, the higher the gas pressure, the greater the amount of readily-adsorbed gas adsorbed. When the pressure is reduced, the adsorbed component is released, or desorbed from the adsorbent material.

The swing adsorption processes (e.g., PSA and/or TSA) may be used to separate gases of a gas mixture because different gases tend to fill the microporous structure of the adsorbent material to different extents. For example, if a gas mixture, such as natural gas, is passed under pressure through a vessel containing an adsorbent material that is more selective towards carbon dioxide than it is for methane, at least a portion of the carbon dioxide is selectively adsorbed by the adsorbent material, and the gas exiting the vessel is enriched in methane. When the adsorbent material reaches the end of its capacity to adsorb carbon dioxide, it is regenerated by reducing the pressure, thereby releasing the adsorbed carbon dioxide. Then, the adsorbent material is typically purged and re-pressurized prior to starting another adsorption cycle.

The swing adsorption processes typically involve adsorbent bed units, which include adsorbent beds disposed within a housing and configured to maintain fluids at various pressures for different steps in a cycle within the unit. These adsorbent bed units utilize different packing material in the bed structures. For example, the adsorbent bed units utilize checker brick, pebble beds or other available packing. As an enhancement, some adsorbent bed units may utilize engineered packing within the bed structure. The engineered packing may include a material provided in a specific configuration, such as a honeycomb, ceramic forms or the like.

Further, various adsorbent bed units may be coupled together with conduits and valves to manage the flow of fluids through the cycle. Orchestrating these adsorbent bed units involves coordinating the steps in the cycle for each of the adsorbent bed units with other adsorbent bed units in the system. When a series of "steps" is completed for an adsorbent bed unit, the "cycle" for the adsorption process/system is complete and the series of steps is repeated in subsequent, repeating cycles. A complete cycle can vary from seconds to minutes to hours as it transfers a plurality of gaseous streams through one or more of the adsorbent bed units.

A challenge with rapid cycle processes is that during an adsorption step, the product composition can vary widely making product specification control difficult. Additionally, a pressure pulse can spike in the system as the adsorption system changes the feed stream from one adsorbent bed unit to the next adsorbent bed unit in the system/cycle leading to damage to the adsorbent bed unit and/or the associated piping, valves and/or control equipment.

Accordingly, there remains a need in the industry for new apparatus, methods, and systems that can address these problems in cyclic swing adsorption process. In particular, a need exists for improved systems and methods for reducing the product composition swings during adsorption steps in rapid cycle swing adsorption processes, as well as a need for improved systems and methods for reducing the contaminant levels in the product composition down to extremely low levels (a few parts per million volume (ppmv)) while retaining high levels of the retained preferred product composition (such as methane).

SUMMARY OF THE INVENTION

In one embodiment, a process for removing contaminants from a gaseous feed stream with a swing adsorption process using a cyclic swing adsorption system comprising a plurality of adsorption bed units is described, the process comprising: a) performing a first adsorption step on a first adsorption bed unit, wherein the first adsorption step comprises passing a combined gaseous feed stream through the first adsorption bed unit to remove one or more contaminants and produce a product stream, while concurrently (or alternatively simultaneously) performing a first cooling step on a second adsorption bed unit; b) performing a second adsorption step on the first adsorption bed unit, wherein the second adsorption step comprises concurrently (or alternatively simultaneously) passing the combined gaseous feed stream concurrently (or alternatively simultaneously) through the first adsorption bed unit and the second adsorbent bed unit to remove the one or more contaminants and produce the product stream; c) interrupting the flow of the gaseous feed stream to the first adsorbent bed unit while retaining the flow of the combined gaseous feed stream to the second adsorbent bed unit; d) performing a cleaning purge step on the first adsorbent bed unit, wherein the cleaning purge step comprises passing a cleaning purge stream through the first adsorbent bed unit to remove one or more contaminants from the first adsorbent bed unit at a first temperature; e) interrupting the flow of the cleaning purge stream to the first adsorbent bed unit; f) performing a heating purge step on the first adsorbent bed unit, wherein the heating purge heating step comprises passing a heating purge stream through the first adsorbent bed unit to remove one or more contaminants from the first adsorbent bed unit at a first temperature; g) interrupting the flow of the heating purge stream to the first adsorbent bed unit; and h) performing a second cooling step on the first adsorbent bed unit, wherein the second cooling step comprises lessening the temperature of an adsorbent material in the first adsorbent bed unit by passing a first portion of a gaseous feed stream through the first adsorbent bed unit to produce a hot gaseous feed stream, wherein concurrently (or alternatively simultaneously) a second portion of the gaseous feed stream bypasses the first adsorbent bed unit, and wherein during the second cooling step the hot gaseous feed stream and the second portion of the gaseous feed stream are combined to form the combined gaseous feed stream.

In one or more embodiments, the process includes one or more enhancements. In one or more embodiments, the process may further comprise wherein the first adsorbent bed unit and the second adsorbent bed unit are part of a swing adsorption system and the swing adsorption system comprises a number of adsorbent bed units (X) and the duration of a total cycle time for the swing adsorption process is the time for each step (Y) times the number of adsorbent bed units (X). In one or more embodiments, the process may further comprise wherein the first adsorbent bed unit and the second adsorbent bed unit each go through two sequential back-to-back adsorption steps, such that a total duration that each the first adsorbent bed unit and the second adsorbent bed unit are subject to one or more adsorption steps is equal to a period of two times Y during the total cycle time for the swing adsorption process. In one or more embodiments, the process may further comprise wherein the adsorption period of two times Y of the first adsorbent bed unit and the adsorption period of two times Y of the second adsorbent bed unit overlap, but the start of the adsorption period of the first adsorbent bed unit and the start of the adsorption period of the second adsorbent bed unit are at different times in the total cycle time of swing adsorption process.

In one or more embodiments, the process may further comprise wherein the swing adsorption system comprises at least five adsorption bed units. In one or more embodiments, the process may further comprise wherein at a point in the total cycle of the adsorption system at least one adsorption bed unit is subject to the cooling step, at least two adsorption bed units are subject to the adsorption step, at least one adsorption bed unit is subject to the cleaning purge step, and at least one adsorption bed unit is subject to the heating purge step. In one or more embodiments, the process may further comprise passing the at least a portion of the hot gaseous feed stream or at least a portion of the combined gaseous feed stream through a cooling unit to lower the temperature of the hot gaseous feed stream or the combined gaseous feed stream prior to passing the combined gaseous feed stream to the first adsorbent bed unit and the second adsorbent bed unit.

In one embodiment, a cyclical swing adsorption system is described, the system comprising: a plurality of adsorbent bed units coupled to a plurality of manifolds, each of the adsorbent bed units is configured to pass different streams through the adsorbent bed unit between two or more steps in a swing adsorption cycle and each of the adsorbent bed units is configured to remove one or more contaminants from a feed stream to form a product stream and wherein each of the adsorbent bed units comprise: a housing; an adsorbent material disposed within the housing; a plurality of valves, wherein at least one of the plurality of valves is associated with one of the plurality of manifolds and is configured to manage fluid flow along a flow path extending between the respective manifold and the adsorbent material; and wherein the cyclical swing adsorption system is configured to concurrently (or alternatively simultaneously) pass a gaseous feed stream through at least two of the adsorbent bed units.

In one or more embodiments, the system includes one or more enhancements. In one or more embodiments, the system may further comprise wherein the same stream is a gaseous feed stream containing hydrocarbons and at least one contaminant. In one or more embodiments, the system may further comprise wherein the at least one contaminant is water ($H_2O$) or carbon dioxide ($CO_2$).

In one or more embodiments, the system may further comprise wherein the plurality of manifolds comprises a cooling inlet manifold configured to pass at least a portion of the gaseous feed stream to the plurality of adsorbent bed units during cooling step, a feed manifold configured to pass at least a portion of the gaseous the feed stream to the plurality of adsorbent bed units during an adsorption step, a product manifold configured to pass the product stream from the plurality of adsorbent bed units during the adsorption step, a cleaning purge manifold configured to pass a cleaning purge stream to the plurality of adsorbent bed units during a cleaning purge step, and a heating purge manifold configured to pass a heating purge stream to the plurality of adsorbent bed units during a heating purge step. In one or more embodiments, the system may further comprise wherein cyclical swing adsorption system further comprises a control unit for controlling the opening and closing the plurality of valves during each step in the swing adsorption cycle, the plurality of valves comprises at least one inlet valve for each adsorbent bed unit for controlling the flow of the gaseous feed stream from the feed manifold to the plurality of adsorbent bed units, and is configured to open the at least one inlet valve on two of the adsorbent bed units during the adsorption step. In one or more embodiments, the system may further comprise wherein the feed manifold comprises a cooling unit.

BRIEF DESCRIPTION OF THE FIGURES

The foregoing and other advantages of the present disclosure may become apparent upon reviewing the following detailed description and drawings of non-limiting examples of embodiments. The drawings may be referred to in the singular as "Figure" or "Fig.", and in the plural as "Figures" or "Figs".

DETAILED DESCRIPTION OF THE INVENTION

Figure 1:
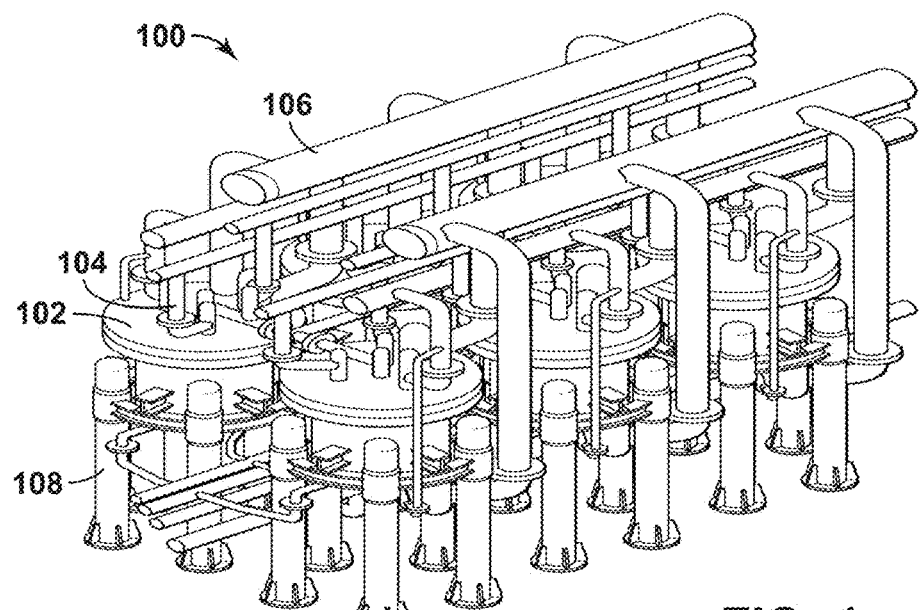
FIG. 1 is a three-dimensional diagram of the swing adsorption system with six adsorbent bed units and interconnecting piping in accordance with an embodiment of the present techniques.

Unless otherwise explained, all technical and scientific terms used herein have the same meaning as commonly understood by one of ordinary skill in the art to which this disclosure pertains. The singular terms "a," "an," and "the" include plural referents unless the context clearly indicates otherwise. Similarly, the word "or" is intended to include "and" unless the context clearly indicates otherwise. The term "includes" means "comprises." All patents and publications mentioned herein are incorporated by reference in their entirety, unless otherwise indicated. In case of conflict as to the meaning of a term or phrase, the present specification, including explanations of terms, control. Directional terms, such as "upper," "lower," "top," "bottom," "front," "back," "vertical," and "horizontal," are used herein to express and clarify the relationship between various elements. It should be understood that such terms do not denote absolute orientation (e.g., a "vertical" component can become horizontal by rotating the device). The materials, methods, and examples recited herein are illustrative only and not intended to be limiting.

As used herein, "stream" refers to fluid (e.g., solids, liquid and/or gas) being conducted through various equipment. The equipment may include conduits, vessels, manifolds, units or other suitable devices.

As used herein, "conduit" refers to a tubular member forming a channel through which something is conveyed. The conduit may include one or more of a pipe, a manifold, a tube or the like.

As used herein, "concurrently" refers to at the same time or sufficiently close in time to produce a combined effect, which may be simultaneously, or it may be two or more operations or events occurring within a time period that overlaps, while each may start or stop before or after each other. As an example, the two selected operations or steps occur during coincident or overlapping time periods, either where one begins and ends during the duration of the other, or where a later one starts before the completion of the other.

As used herein, "simultaneously" refers to operating at the same time.

The provided processes, apparatus, and systems of the present techniques may be used in swing adsorption processes that remove contaminants, such as $H_2O$ and/or $CO_2$ from feed streams, such as hydrocarbon containing streams or "hydrocarbon feed streams".

In some embodiments, the hydrocarbon feed stream may need to be dehydrated through the removal of water ($H_2O$) from the hydrocarbon feed stream to meet certain water content specifications for either final product use or to be suitable for use in further processing of the hydrocarbon containing feed stream. For example, the hydrocarbon feed stream may include water content in a range between 10 parts per million volume (ppmv) to 2,000 ppmv or in a range between 50 parts per million volume (ppmv) to 10,000 ppmv, while the feed stream may include a $CO_2$ content in the range between 200 ppmv percent to 20,000 ppmv (2 volume percent (vol %)), 200 ppmv percent to 5,000 ppmv or in a range between 500 ppmv to 10 vol %. The specifications for the product stream may include water content less than 10 ppmv, less than 5 ppmv, less than 1 ppmv, or less than 0.1 ppmv and/or may include a $CO_2$ content less than 1,000 ppmv, less than 100 ppmv or less than 50 ppmv. It is noted that unless otherwise stated herein, if the term "ppm" is utilized, it means "ppmv". The processing of feed streams may be more problematic when certain specifications have to be satisfied.

The removal of contaminants may be performed by swing adsorption processes to prepare the stream for further downstream processing, such as natural gas liquefaction (NGL) processing and/or LNG processing. For example, natural gas feed streams for liquefied natural gas (LNG) applications have stringent specifications on the water ($H_2O$) and/or carbon dioxide ($CO_2$) content to ensure against formation of solid $H_2O$ and/or solid $CO_2$ at cryogenic temperatures. The LNG specifications may require the $H_2O$ content to be less than or equal to 0.1 ppmv. The LNG specifications may require the $CO_2$ content to be less than or equal to 50 ppmv. Such specifications are not applied on natural gas streams in pipeline networks, which may involve the $H_2O$ content up to 150 ppmv and a $CO_2$ content up to 20,000 ppmv based on the total volume of the gaseous feed stream. As such, for LNG facilities that use the pipeline gas (e.g., natural gas) as the raw feed, additional treating or processing steps are utilized to further purify the stream.

The present techniques provide configurations and processes that are utilized to enhance swing adsorption processes. As noted above, rapid cycle pressure and temperature swing adsorption processes may be used to dehydrate streams and/or remove low-level $CO_2$ to exceptionally low levels. To manage the product compositional fluctuations, as well as adsorption bed temperature deviations and pressure pulses in the swing adsorption system associated with the transition of streams within the adsorbent beds between the steps in the cycle, the present techniques may include additional steps or mechanisms. The present techniques provide a method to minimize the temperature, pressure and/or product stream composition in a rapid cycle swing adsorption process. In other configurations, a system may be utilized to minimize the compositional fluctuations in one or more streams being conducted away from the rapid cycle swing adsorption process units.

The present techniques may be a swing adsorption process, and specifically a rapid cycle adsorption process. The present techniques may include some additional equipment, such as one or more conduits, one or more manifolds and/or one or more adsorption bed units that provide a fluid paths or steps for the swing adsorption process. In addition, other components and configurations may be utilized to provide the swing adsorption process, such as rapid cycle enabling hardware components (e.g., parallel channel adsorbent bed designs, rapid actuating valves, adsorbent bed configurations that integrate with other processes). Exemplary swing adsorption processes and configurations may include U.S. Patent Application Publication Nos. 2017/0056814, 2017/0113175 and 2017/0113173, and U.S. Pat. Nos. 10,080,991, 10,124,286, 10,080,992 and 10,040,022, which are each incorporated by reference herein.

In one or more configurations, a swing adsorption process may include performing various steps. For the example, the present techniques may be used to remove contaminants from a gaseous feed stream with a swing adsorption process, which may be utilized with one or more downstream processes.

In other certain embodiments, the swing adsorption process may be integrated with downstream equipment and processes. The downstream equipment and processes may include control freeze zone (CFZ) applications, nitrogen removal unit (NRU), cryogenic NGL recovery applications, LNG applications, and other such applications. Each of these different applications may include different specifications for the feed stream in the respective process. For example, a cryogenic NGL process or an LNG process and may be integrated with the respective downstream equipment. As another example, the process may involve $H_2O$ and/or $CO_2$ removal upstream of a cryogenic NGL process or the LNG process and may be integrated with respective downstream equipment.

In certain configurations, the system utilizes a combined swing adsorption process, which combines TSA and PSA, for treating of pipeline quality natural gas to remove contaminants for the stream to satisfy LNG specifications and/or cryogenic NGL specifications. The LNG specifications and cryogenic NGL specifications may involve the $CO_2$ content to be less than or equal to 50 ppmv, while the water content of the stream may be less than 0.1 ppmv.

Moreover, the present techniques may include a specific process flow to remove contaminants, such as $CO_2$ and/or water. For example, the process may include an adsorbent step. The adsorbent step may include passing a gaseous feed stream at a feed pressure and feed temperature through an adsorbent bed unit to separate one or more contaminants from the gaseous feed stream to form a product stream. The feed stream may be passed through the adsorbent bed in a forward direction (e.g., from the feed end of the adsorbent bed to the product end of the adsorbent bed). Then, the flow of the gaseous feed stream may be interrupted for a regeneration or purge step(s). Other steps in the pressure swing process may include one or more depressurization steps and/or one or more re-pressurization steps. The total swing adsorption cycle duration (in which one cycle consists of a series of all of the "steps") may be for a period greater than 1 second and less than 600 seconds, for a period greater than 2 second and less than 300 seconds, for a period greater than 2 second and less than 180 seconds, for a period greater than 5 second and less than 150 seconds or for a period greater than 5 second and less than 90 seconds.

In one or more embodiments, the present techniques can be used for any type of swing adsorption process. Non-limiting swing adsorption processes for which the present techniques may be used include pressure swing adsorption (PSA), vacuum pressure swing adsorption (VPSA), temperature swing adsorption (TSA), partial pressure swing adsorption (PPSA), rapid cycle pressure swing adsorption (RCPSA), rapid cycle thermal swing adsorption (RCTSA), rapid cycle partial pressure swing adsorption (RCPPSA), as well as combinations of these processes. For example, the preferred swing adsorption process may include a combined pressure swing adsorption and temperature swing adsorption, which may be performed as a rapid cycle process. Exemplary swing adsorption processes and configurations may include U.S. Patent Application Publication Nos. US2017/0056814, US2017/0113175 and US2017/0113173, and U.S. Pat. Nos. 10,080,991, 10,124,286, 10,080,992, 10,040,022, 7,959,720, 8,545,602, 8,529,663, 8,444,750, 8,529,662 and 9,358,493, which are each herein incorporated by reference in their entirety.

Further still, in one or more configurations, a variety of adsorbent materials may be used to provide the mechanism for the separations. Examples include zeolite 3A, 4A, 5A, RHO, DDR, ZK4 and Metal Organic Framework-74 (MOF-74). However, the process is not limited to these adsorbent materials, and other adsorbent materials known in the art may be used in the processes and systems disclosed herein.

In one configuration, a process for removing contaminants from a gaseous feed stream with a swing adsorption process using a cyclic swing adsorption system comprising a plurality of adsorption bed units is described. The process may comprise: a) performing a first adsorption step on a first adsorption bed unit, wherein the first adsorption step comprises passing a combined gaseous feed stream through the first adsorption bed unit to remove one or more contaminants and produce a product stream, while concurrently (or alternatively simultaneously) performing a first cooling step on a second adsorption bed unit; b) performing a second adsorption step on the first adsorption bed unit, wherein the second adsorption step comprises concurrently (or alternatively simultaneously) passing the combined gaseous feed stream concurrently (or alternatively simultaneously) through the first adsorption bed unit and the second adsorbent bed unit to remove the one or more contaminants and produce the product stream; c) interrupting the flow of the gaseous feed stream to the first adsorbent bed unit while retaining the flow of the combined gaseous feed stream to the second adsorbent bed unit; d) performing a cleaning purge step on the first adsorbent bed unit, wherein the cleaning purge step comprises passing a cleaning purge stream through the first adsorbent bed unit to remove one or more contaminants from the first adsorbent bed unit at a first temperature; e) interrupting the flow of the cleaning purge stream to the first adsorbent bed unit; f) performing a heating purge step on the first adsorbent bed unit, wherein the heating purge heating step comprises passing a heating purge stream through the first adsorbent bed unit to remove one or more contaminants from the first adsorbent bed unit at a first temperature; g) interrupting the flow of the heating purge stream to the first adsorbent bed unit; and h) performing a second cooling step on the first adsorbent bed unit, wherein the second cooling step comprises lessening the temperature of an adsorbent material in the first adsorbent bed unit by passing a first portion of a gaseous feed stream through the first adsorbent bed unit to produce a hot gaseous feed stream, wherein concurrently (or alternatively simultaneously) a second portion of the gaseous feed stream bypasses the first adsorbent bed unit, and wherein during the second cooling step the hot gaseous feed stream and the second portion of the gaseous feed stream are combined to form the combined gaseous feed stream.

In one or more configurations, the process may include one or more enhancements. For instance, the process may comprise wherein the first adsorbent bed unit and the second adsorbent bed unit are part of a swing adsorption system and the swing adsorption system comprises a number of adsorbent bed units (X) and the duration of a total cycle time for the swing adsorption process is the time for each step (Y) (or the cycle time interval (Y)) times the number of adsorbent bed units (X). In particular, the steps in a cyclic process involving multiple adsorption bed units operate on a cycle time interval $\Delta t$ defined as the ratio of the total cycle time ($t_{cycle}$) to the number of adsorbent bed units in the process ($n_{beds}$) (e.g., $\Delta t = t_{cycle}/n_{beds}$). Therefore, the total cycle time is given by the equation of $t_{cycle} = n_{beds} \Delta t$. In the present techniques, when an additional cooling step is introduced, this necessarily result in the inclusion an additional adsorbent bed unit to the process, which results in an increase in cycle time interval of $\Delta t$. The process may comprise wherein the first adsorbent bed unit and the second adsorbent bed unit each go through two sequential back-to-back adsorption steps, such that a total duration that each the first adsorbent bed unit and the second adsorbent bed unit are subject to one or more adsorption steps is equal to a period of two times Y during the total cycle time for the swing adsorption process. The process may comprise wherein the adsorption period of two times Y of the first adsorbent bed unit and the adsorption period of two times Y of the second adsorbent bed unit overlap, but the start of the adsorption period of the first adsorbent bed unit and the start of the adsorption period of the second adsorbent bed unit are at different times in the total cycle time of swing adsorption process.

In another configuration, a cyclical swing adsorption system is described. The system may comprise a plurality of adsorbent bed units coupled to a plurality of manifolds, each of the adsorbent bed units is configured to pass different streams through the adsorbent bed unit between two or more steps in a swing adsorption cycle and each of the adsorbent bed units is configured to remove one or more contaminants from a feed stream to form a product stream and wherein each of the adsorbent bed units comprise: a housing; an adsorbent material disposed within the housing; a plurality of valves, wherein at least one of the plurality of valves is associated with one of the plurality of manifolds and is configured to manage fluid flow along a flow path extending between the respective manifold and the adsorbent material; and wherein the cyclical swing adsorption system is configured to concurrently (or alternatively simultaneously) pass a gaseous feed stream through at least two of the adsorbent bed units.

In one or more configurations, the system may include one or more enhancements. The cyclical swing adsorption system may comprise wherein the same stream is a gaseous feed stream containing hydrocarbons and at least one contaminant. The system may comprise wherein the at least one contaminant is water ($H_2O$) or carbon dioxide ($CO_2$). The system may comprise wherein the plurality of manifolds comprises a cooling inlet manifold configured to pass at least a portion of the gaseous feed stream to the plurality of adsorbent bed units during cooling step, a feed manifold configured to pass at least a portion of the gaseous the feed stream to the plurality of adsorbent bed units during an adsorption step, a product manifold configured to pass the product stream from the plurality of adsorbent bed units during the adsorption step, a cleaning purge manifold configured to pass a cleaning purge stream to the plurality of adsorbent bed units during a cleaning purge step, and a heating purge manifold configured to pass a heating purge stream to the plurality of adsorbent bed units during a heating purge step. The system may further comprise wherein cyclical swing adsorption system further comprises a control unit for controlling the opening and closing the plurality of valves during each step in the swing adsorption cycle, the plurality of valves comprises at least one inlet valve for each adsorbent bed unit for controlling the flow of the gaseous feed stream from the feed manifold to the plurality of adsorbent bed units, and is configured to open the at least one inlet valve on two of the adsorbent bed units during the adsorption step. In one or more embodiments, the system may further comprise wherein the feed manifold comprises a cooling unit.

FIG. 1 is a three-dimensional diagram of the swing adsorption system 100 having six adsorbent bed units and interconnecting piping. While this configuration is a specific example, the present techniques broadly relate to adsorbent bed units that can be deployed in a symmetrical orientation, or non-symmetrical orientation and/or combination of a plurality of hardware skids. Further, this specific configuration is for exemplary purposes as other configurations may include different numbers of adsorbent bed units.

In this system, the adsorbent bed units, such as adsorbent bed unit 102, may be configured for a cyclical swing adsorption process for removing contaminants from feed streams (e.g., fluids, gaseous or liquids). For example, the adsorbent bed unit 102 may include various conduits (e.g., conduit 104) for managing the flow of fluids through, to or from the adsorbent bed within the adsorbent bed unit 102. These conduits from the adsorbent bed units 102 may be coupled to a manifold (e.g., manifold 106) to distribute the flow to, from or between components. The adsorbent bed within an adsorbent bed unit may separate one or more contaminants from the feed stream to form a product stream. As may be appreciated, the adsorbent bed units may include other conduits to control other fluid streams as part of the process, such as purge streams, depressurizations streams, and the like. In particular, the adsorbent bed units may include startup mode equipment, such as one or more heating units (not shown), one or more external gas source manifolds, which may be one of the manifolds 106) and one or more expanders, as noted further below, which is used as part of the startup mode for the adsorbent beds. Further, the adsorbent bed unit may also include one or more equalization vessels, such as equalization vessel 108, which are dedicated to the adsorbent bed unit and may be dedicated to one or more step in the swing adsorption process. The equalization vessel 108 may be used to store the external stream, such as nitrogen for use in the startup mode cycle.

As an example, which is discussed further below with respect to FIG. 2, the adsorbent bed unit 102 may include a housing, which may include a head portion and other body portions, that forms a substantially gas impermeable partition, an adsorbent bed disposed within the housing and a plurality of valves (e.g., poppet valves) providing fluid flow passages through openings in the housing between the interior region of the housing and locations external to the interior region of the housing. Each of the poppet valves may include a disk element that is seatable within the head or a disk element that is seatable within a separate valve seat inserted within the head (not shown). The configuration of the poppet valves may be any variety of valve patterns or configuration of types of poppet valves. As an example, the adsorbent bed unit may include one or more poppet valves, each in flow communication with a different conduit associated with different streams. The poppet valves may provide fluid communication between the adsorbent bed and one of the respective conduits, manifolds or headers. The term "in direct flow communication" or "in direct fluid communication" means in direct flow communication without intervening valves or other closure means for obstructing flow. As may be appreciated, other variations may also be envisioned within the scope of the present techniques.

The adsorbent bed comprises a solid adsorbent material capable of adsorbing one or more components from the feed stream. Such solid adsorbent materials are selected to be durable against the physical and chemical conditions within the adsorbent bed unit 102 and can include metallic, ceramic, or other materials, depending on the adsorption process. Further examples of adsorbent materials are noted further below.

Figure 2:
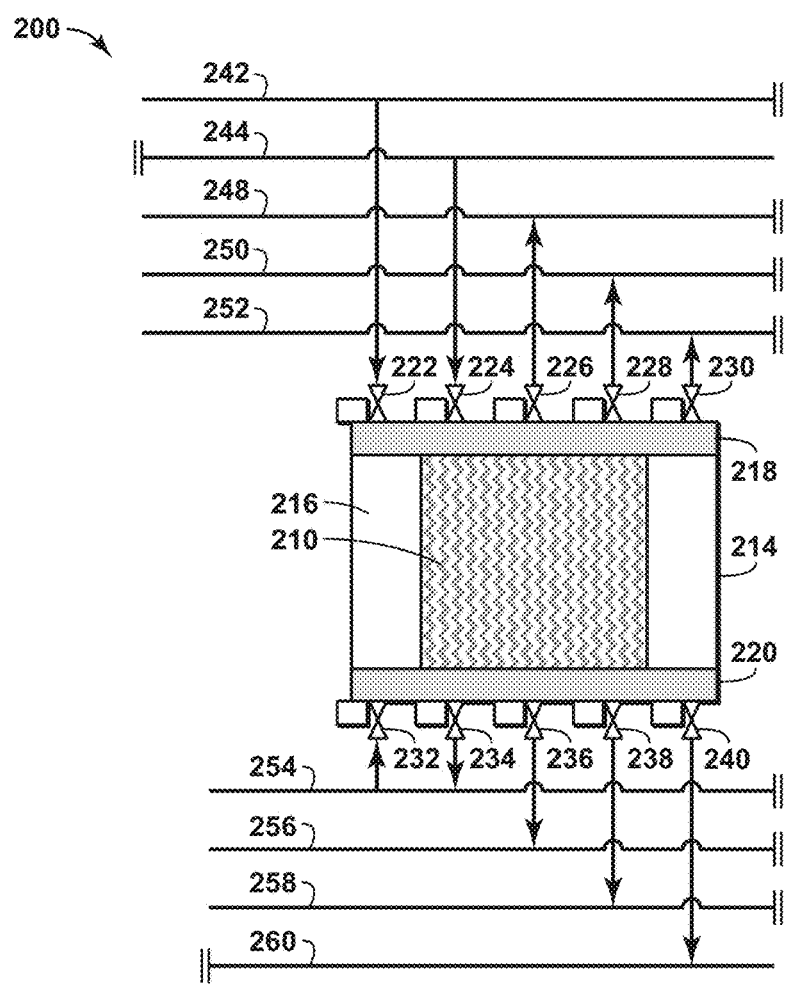
FIG. 2 is a diagram of a portion of an adsorbent bed unit having associated valve assemblies and manifolds in accordance with an embodiment of the present techniques.

FIG. 2 is a diagram of a portion of an adsorbent bed unit 200 having valve assemblies and manifolds in accordance with an embodiment of the present techniques. The portion of the adsorbent bed unit 200, which may be a portion of the adsorbent bed unit 102 of FIG. 1, includes a housing or body, which may include a cylindrical wall 214 and cylindrical insulation layer 216 along with an upper head 218 and a lower head 220. An adsorbent bed 210 is disposed between an upper head 218 and a lower head 220 and the insulation layer 216, resulting in an upper open zone, and lower open zone, which open zones are comprised substantially of open flow path volume. Such open flow path volume in adsorbent bed unit contains gas that has to be managed for the various steps. The housing may be configured to maintain a pressure from 0 bara (bar absolute) to 150 bara within the interior region.

The upper head 218 and lower head 220 contain openings in which valve structures can be inserted, such as valve assemblies 222 to 240, respectively (e.g., poppet valves). The upper or lower open flow path volume between the respective head 218 or 220 and adsorbent bed 210 can also contain distribution lines (not shown) which directly introduce fluids into the adsorbent bed 210. The upper head 218 contains various openings (not show) to provide flow passages through the inlet manifolds 242 and 244 and the outlet manifolds 248, 250 and 252, while the lower head 220 contains various openings (not shown) to provide flow passages through the inlet manifold 254 and the outlet manifolds 256, 258 and 260. Disposed in fluid communication with the respective manifolds 242, 244, 248, 250, 252, 254, 256, 258 and 260 are the valve assemblies 222, 224, 226, 228, 230, 232, 234, 236, 238 and 240. If the valve assemblies 222, 224, 226, 228, 230, 232, 234, 236, 238 and 240 are poppet valves, each may include a disk element connected to a stem element which can be positioned within a bushing or valve guide. The stem element may be connected to an actuating means, such as actuating means (not shown), which is configured to have the respective valve impart linear motion to the respective stem. As may be appreciated, the actuating means may be operated independently for different steps in the process to activate a single valve or a single actuating means may be utilized to control two or more valves. Further, while the openings may be substantially similar in size, the openings and inlet valves for inlet manifolds may have a smaller diameter than those for outlet manifolds, given that the gas volumes passing through the inlets may tend to be lower than product volumes passing through the outlets.

In swing adsorption processes, the cycle involves two or more steps that each has a certain time interval, which are summed together to be the cycle time or cycle duration. These steps include regeneration of the adsorbent bed following the adsorption step using a variety of methods including pressure swing, vacuum swing, temperature swing, purging (via any suitable type of purge fluid for the process), and combinations thereof. As an example, a PSA cycle may include the steps of adsorption, depressurization, purging, and re-pressurization. When performing the separation at high pressure, depressurization and re-pressurization (which may be referred to as equalization) may be performed in multiple steps to reduce the pressure change for each step and enhance efficiency. In some swing adsorption processes, such as rapid cycle swing adsorption processes, a substantial portion of the total cycle time is involved in the regeneration of the adsorbent bed. Accordingly, any reductions in the amount of time for regeneration results in a reduction of the total cycle time. This reduction may also reduce the overall size of the swing adsorption system.

Further, one or more of the manifolds and associated valves may be utilized as a dedicated flow path for one or more streams. For example, during the adsorption or feed step, the manifold 242 and valve assembly 222 may be utilized to pass the feed gas stream to the adsorbent bed 210, while the valve assembly 236 and manifold 256 may be used to conduct away the product stream from the adsorbent bed 210. During the regeneration or purge step, the manifold 244 and valve assembly 224 may be utilized to pass the purge or heating stream to the adsorbent bed 210, while the valve assembly 236 and manifold 256 may be used to conduct away the purge product stream from the adsorbent bed 210. Further, the manifold 254 and valve assembly 232 may be utilized for a cooling step, while the valve assembly 230 and manifold 252 may be used to conduct away the cooling step product stream from the adsorbent bed 210. As may be appreciated, the purge stream and/or cooling stream may be configured to flow counter current to the feed stream in certain embodiments.

The configuration shown in FIG. 2 may be illustrative of swing adsorption processes in general and other configurations of manifolds, adsorbent beds and valves may be utilized as further described in embodiments/arrangement herein which may differ from the basic configuration shown in FIG. 2. In an alternative embodiment, the swing adsorption process may involve sharing one or more of the manifolds and associated valves (not shown in FIG. 2). In another alternative embodiment, the swing adsorption process may involve a cross-over of the manifolds and associated valves to allow one manifold to be fed into one or more of any manifold as shown or further described in embodiments herein (not shown in FIG. 2). Beneficially, these different configurations may be utilized to lessen any additional valves or connections for adsorbent bed unit configurations that are subject to space limitations on the respective heads.

As noted above, the present techniques include various procedures that may be utilized for the swing adsorption process. The present techniques may include additional steps or mechanisms to manage the temperature, compositional, and pressure pulses associated with the adsorbent beds and the associated streams within the adsorbent beds during different steps in the overall pressure swing adsorption cycle. Configurations of the pressure swing adsorption cycles and the associated systems are described further herein.

Figure 3:
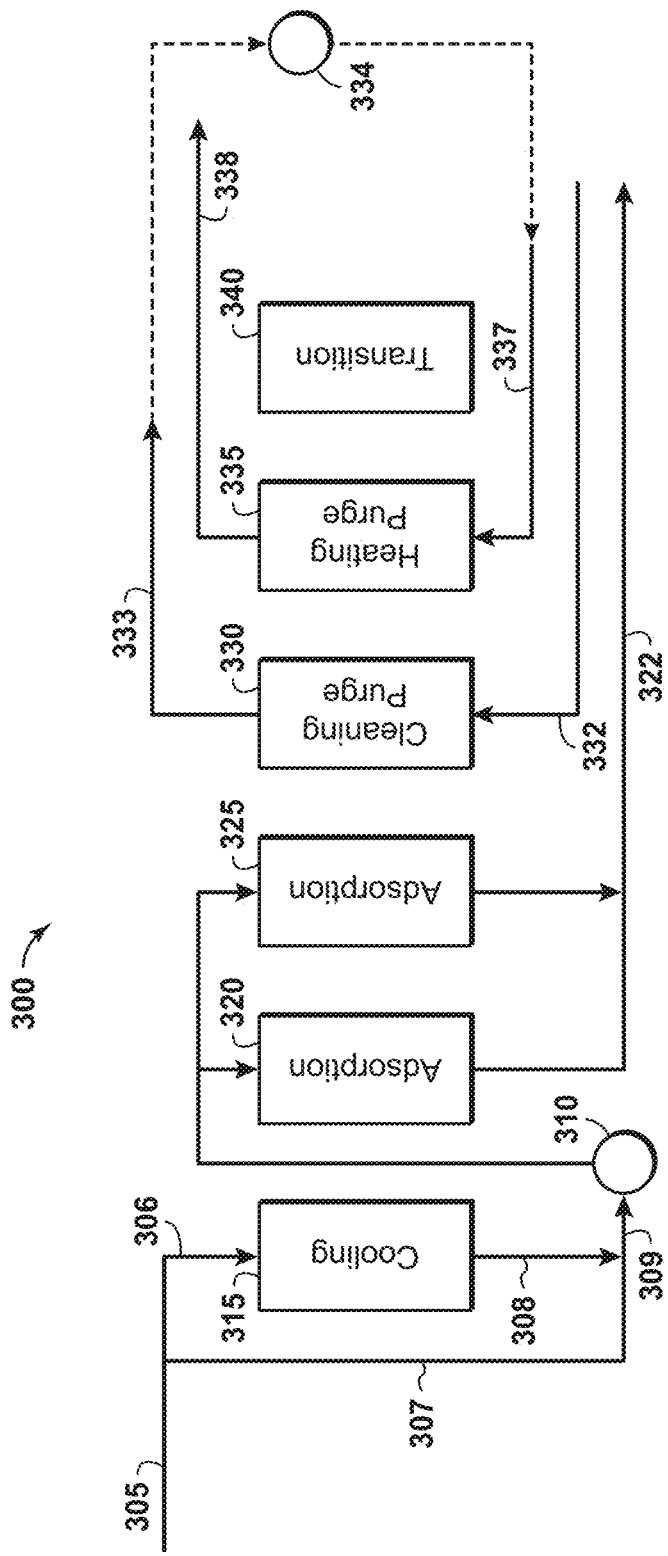
FIG. 3 is an exemplary diagram of adsorption bed units/steps in a swing adsorption process in accordance with an embodiment of the present techniques.

FIG. 3 is an exemplary diagram of a swing adsorption system 300 in accordance with an embodiment of the present techniques. The rectangles in the process schemes show each of the "steps" of the process swing adsorption cycle which each adsorbent bed may be at any one time. The rectangles in the process schemes also illustrate the subsequent "steps" of the process swing adsorption cycle which a single adsorbent bed may move through, step-by-step, in an overall swing adsorption cycle.

In this configuration, a first portion 306 of a gaseous feed stream 305 is sent through an adsorption bed unit in a cooling step 315 which adsorption bed has just finished progressing through an overall process swing adsorption cycle, while concurrently (or alternatively simultaneously), a second portion 307 of the gaseous feed stream 305 is bypassed around adsorption bed unit 315 that is in a cooling step. In this process, the first portion 305 of a gaseous feed stream 305 reduces the temperature of the adsorption bed unit 315 which prepares the adsorption bed unit 315 for increased adsorption rates in the subsequent adsorption (or "feed") step. A hot gaseous feed stream 308 is produced from adsorption bed unit 315 where it is combined with the second portion 307 of the gaseous feed stream 305 to form a combined gaseous feed stream 309. As shown in FIG. 3, the combined gaseous feed stream 309 is preferably, but optionally, sent through a cooling unit 310 to reduce the temperature of the combined gaseous feed stream 309. Although not illustrated in FIG. 3, the cooling unit 310 can alternatively be located in the hot gaseous feed stream 308 line to cool the hot gaseous feed stream 308 before combining with the second portion 307 of the gaseous feed stream 305 to form the combined gaseous feed stream 309. The gaseous feed stream 305 may be split into first portion 306 and the second portion 307 of the gaseous feed stream 305 in various percentages. Such first portion 306 and the second portion 307 percentages, as a total of the gaseous feed stream 305 may be from 90:10 to 10:90, 80:20 to 20:80, or 70:30 to 30:70 (by volume). As an example, the first portion 306 may be between 90 vol % and 10 vol %, while the second portion 307 may be between 10 volume % and 90 volume %, with the combination of the first portion and the second portion being 100% of the gaseous feed stream 305. As another example, the first portion 306 may be between 80 volume % and 20 volume %, while the second portion 307 may be between 20 volume % and 80 volume %, with the combination of the first portion and the second portion being 100% of the gaseous feed stream 305. Further, as yet another example, the first portion 306 may be between 70 volume % and 30 volume %, while the second portion 307 may be between 20 volume % and 80 volume %, with the combination of the first portion and the second portion being 100% of the gaseous feed stream 305. In other preferred embodiments, the first portion 306 of the gaseous feed stream 305, is at least 50% (by volume), at least 60% (by volume), or at least 75% (by volume) of the total gaseous feed stream 305. In preferred embodiments, the gaseous feed stream 305 may be at a temperature from about 80° F. (Fahrenheit) to about 120° F., and a pressure from about 800 psig to about 1400 psig. In preferred embodiments, the combined gaseous feed stream 309 may be at a temperature from about 120° F. to about 300° F., and a pressure from about 800 pounds per square inch gauge (psig) to about 1400 psig.

In the present process, instead of only one adsorbent bed being in a feed step at any one time, in the present techniques, the combined gaseous feed stream 309 utilizes two adsorbent bed concurrently (or alternatively simultaneously) in the adsorption steps. These are shown as adsorbent bed units (or steps) 320 and 325 in FIG. 3. Here, this process splits the flow from a cooling step (single adsorption bed unit 315 as well as the bypassing second portion 307) into flow between two adsorbent bed units in an adsorption (or "feed") step. This has multiple advantages (along with the modified cooling step disclosed herein) to controlling the temperature, pressure and product compositional fluctuations in the associated adsorbent bed units (including adsorption bed units/process steps designated as 315, 320 and 325 in FIG. 3) and the product stream 322. The product stream produced by the adsorption swing process is reduced in contaminants that have been selectively adsorbed by the active materials located in the adsorption bed units. These contaminants may be water, carbon dioxide and/or alternatively hydrogen sulfide. In preferred embodiments, the contaminant that is selectively adsorbed by the active materials is water. Preferred adsorbents materials for the processes herein are 3A, 4A, 5A and RHO, however, other adsorbent materials may be utilized in the processes and systems described herein.

The term "selectivity" as used herein, is a relative measure of the adsorbed amount of a first species or compound (such as a contaminant compound, such as $CO_2$) in a feed stream to the adsorbed amount of a second species or compound (such as a preferred product, such as methane ($CH_4$)) in a feed stream. In competitive adsorptive processes, it is generally desired that this ratio to be large, indicating an efficient separation of the two compounds. That is that the first compound has a relatively high affinity for adsorption (i.e., being adsorbed by the adsorptive material) while the second compound has a relatively low affinity for adsorption (i.e., passing through the adsorptive material without being adsorbed) which results in a high selectivity of the adsorptive materials and/or processes.

Selectivity may either be measured as "equilibrium selectivity" ($S_{eq}$) or "kinetic selectivity" ($S_{kin}$), which are defined as follows.

Equilibrium selectivity ($S_{eq}$) may be determined by equation (1) as follows:

$$S_{eq} = \frac{n1/n2}{p1/p2} \quad \text{(Eq. 1)}$$

wherein $n_1$ and $n_2$ are the molar loadings of compounds 1 and 2 at partial pressures of $p_1$ and $p_2$, respectively, during adsorption step (e.g., pressure and temperature conditions during the adsorption step).

Kinetic selectivity ($S_{kin}$) may be determined by equation (2) as follows:

$$S_{kin} = \frac{K_1}{K_2}\sqrt{\frac{D_1}{D_2}} \quad \text{(Eq. 2)}$$

wherein: $K_1$ and $K_2$ are the Henry's law constants for compounds 1 and 2 and $D_1$ and $D_2$ are the diffusivities of compounds 1 and 2, respectively.

In preferred embodiments herein, the adsorbent material has an adsorption selectivity (either equilibrium or kinetic) for the at least one contaminant over methane greater than 5, greater than 10, greater than 25, or greater than 100. In preferred embodiments, the contaminant is water ($H_2O$) or carbon dioxide ($CO_2$). In other preferred embodiments, the adsorbent material is a zeolite.

One of the primary advantages of the presently disclosed system/process is that at least part gaseous feed stream 305 is used for cooling an adsorption bed unit/step 315. This increases the adsorption capacity and selectivity of the adsorption bed unit and associated active materials in the subsequent adsorption steps as shown as 320 and 325 in FIG. 3. A second primary advantage of the presently disclosed system/process, is that preferably at least part of the combined gaseous feed stream 309 is then cooled by a cooling unit 310 to reduce the temperature of the combined gaseous feed stream 309 prior to entering the adsorption bed units/process steps designated as 320 and 325 in FIG. 3, thereby improving adsorption capacity and selectivity during the adsorption step. A third primary advantage of the presently disclosed system/process, is that instead of sending the combined gaseous feed stream 309 through a single adsorption bed unit during the adsorption step of the swing adsorption process, here, the combined gaseous feed stream 309 is split (preferably about evenly) between two adsorption bed units. This significantly reduces the flow through each of the two adsorption bed unit and increases the residence time in each of these adsorption bed units/steps. A fourth primary advantage of the presently disclosed system/process, is that as the individual adsorption bed units cycle between the steps, each adsorption bed unit goes through a first adsorption step (illustrated by adsorption bed units/steps 320) for a first full "step" time and then goes through a second adsorption step (illustrated by adsorption bed units/steps 325) for a second full "step" time as one of adsorption bed units transfer from step 320 to 325 while one of the adsorption bed units (previously in the cooling step 315) moves into the first adsorption step 320. This has a few advantages over the prior art. Besides the approximately one-half flow rate in each of the adsorption bed units in the adsorption steps 320 and 325 at any one time/step in the cycle, the overall adsorption step time is doubled (by going through two subsequent adsorption steps 320 and 325). Additionally, the valving can be designed such that the feed valves on the adsorption units are not opened and closed between the first and second adsorption steps 320 and 325 (i.e., feed valves remain open for an adsorption bed unit during the transition between steps 320 and 325), thereby significantly reducing pressure fluctuations during the transition of an adsorption bed unit from step 315 to 320 (this is due to the fact that one other adsorption bed unit has already been in the adsorption/feed step 320 and is transitioning with this adsorption bed to step 325), as well as significantly reducing pressure fluctuations during the transition of an adsorption bed unit from step 320 to 325 (this is due to the fact that the adsorption bed has already equalized to the pressure of the combined gaseous feed stream 309 in step 320). All of these advantages result in better preparation of the temperature of the adsorption beds units prior to the adsorption/feed steps 320 and 325 resulting in a relatively "flat" (or steady) bed mean temperature profile over the time of the adsorption step, but also in reducing the pressure (and resulting flow) fluctuations in/through the adsorption bed units during the first and second adsorption steps 320 and 325. Illustrations of these benefits are shown in the Example below and corresponding FIGS. 4A, 4B and 5.

In the present process, during the cycle one adsorbent bed unit designated as 330 in FIG. 3 (which adsorbent bed unit has just went through the second adsorption step 325), is subjected to a cleaning purge step 330. In the cleaning purge step 330 the adsorbent bed unit is subjected to a cleaning purge stream 332. In preferred embodiments (as shown in FIG. 3) the cleaning purge stream 332 flows through the adsorbent bed unit in a direction counter-current to the direction in which combined gaseous feed stream 309 flowed through the adsorption bed unit in the prior two adsorption steps and a cleaning purge product stream 333 is produced from the adsorbent bed unit in step 330. In preferred embodiments, the cleaning purge stream 332 contains low amounts of water and/or $CO_2$. In embodiments, the water content in the purge stream is less than 150 ppmv, less than 50 ppmv, less than 1 ppmv, or less than 0.1 ppmv. In embodiments, the $CO_2$ content in the purge stream is less than 20,000 ppmv, less than 1,000 ppmv, less than 100 ppmv, less than 50 ppmv, or less than 25 ppmv. In preferred embodiments, the cleaning purge stream 332 may be at a temperature from about 100° F. to about 400° F., and a pressure from about 300 psig to about 900 psig. In embodiments, the cleaning purge product stream 333 may be sent from the swing adsorption unit for further processing. In another embodiment (as illustrated in FIG. 3), at least a portion of the cleaning purge product stream 333 is sent through a heating unit 334 and returned to the pressure swing adsorption process to an adsorbent bed unit/step 335 as a heating purge stream 337 in a heating purge step. Similar to as in the prior cleaning purge step 330, in the heating purge step 335, in preferred embodiments (as shown in FIG. 3) the heating purge stream 337 flows through the adsorbent bed unit in a direction counter-current to the direction in which combined gaseous feed stream 309 flowed through the adsorption bed unit in the prior two adsorption steps 320 and 325 and a heating purge product stream 338 is produced from the adsorbent bed unit in step 335. The heating purge product stream 338 may be sent to additional facilities for further processing or flaring. In preferred embodiments, the heating purge stream 337 may be at a temperature from about 300° F. to about 500° F. In other preferred embodiments, the temperature of the cleaning purge product stream 333 is increased to about 400° F. to about 450° F. by the heating unit 334 to produce the heating purge stream 337.

It should also be noted that while the five (5) steps of the swing adsorption process are utilized as disclosed herein (which requires one adsorbent bed unit per step, as shown in adsorbent bed units/steps 315, 320, 325, 330 and 335 of FIG. 3), the adsorption swing process may include additional adsorbent bed units/steps as known in the art such as re-pressurization step(s), depressurization/blowdown step (s), or idling step(s) which, for simplification purposes, are represented by a single "transition" adsorption bed unit/step 340 in FIG. 3 and not described in further detail herein, but may be modified as known to one of skill in the art to add additional steps to the processes & systems disclosed herein as required or desired for any particular separation configurations and process specifications.

Example

A model simulation was performed comparing embodiments of the processes of the present invention as disclosed herein. This example compares a first embodiment including a split feed splitting the feed to two (2) separate beds, but without an additional split feed cooling stage (referred to in this example as "without split feed cooling") and a second embodiment including a split feed splitting the feed to two (2) separate beds, but additionally including a split feed cooling stage using a cooling unit prior to splitting the feed to two (2) additional adsorption beds/steps as shown in FIG. 3 (referred to in this example as "with split feed cooling"). The main target in the present processes and the corresponding simulations was to remove a significant amount of $CO_2$ in the final product (target product less than (<) 50 ppmv $CO_2$ with a starting feed stream composition containing 5000 ppmv) while minimizing the loss of methane in the final product composition obtained from the adsorption step(s).

The relevant input stream compositions for the comparative example are shown in Tables 1A and 1B.

TABLE 1A (without split feed cooling)

| Stream ID | $CO_2$ (ppmv) | $CH_4$ (mol %) | $N_2$ (mol %) |
|---|---|---|---|
| Feed | 5000 | 98.5% | 1.0% |
| Product | 698 | 98.7% | 1.2% |

TABLE 1B (with split feed cooling)

| Stream ID | $CO_2$ (ppmv) | $CH_4$ (mol %) | $N_2$ (mol %) |
|---|---|---|---|
| Feed | 5000 | 98.5% | 1.0% |
| Product | 6 | 98.8% | 1.2% |

The total overall cycle time for the "without split feed cooling" was 125 seconds and the total overall cycle time for the "with split feed cooling" was 150 seconds due to the addition of the split feed cooling step of 25 seconds (which corresponds to adding the additional bed/step as shown as element 315 in FIG. 3).

The overall cycle performance results of the two embodiments are shown in Table 2.

TABLE 2

(Overall Cycle Performance)

| Parameter | without split feed cooling | with split feed cooling |
| --- | --- | --- |
| Total Skid Feed Flow (MMSCFD) | 376 | 379 |
| Total Skid Product Flow (MMSCFD) | 368 | 371 |
| Average $CH_4$ in Product (volume percent (vol %)) | 98.7% | 98.8% |
| Average $CO_2$ in Product (ppmv) | 698 | 6 |

MMSCFD is million standard cubic feet per day.

As can be seen from the simulation, the addition of the split feed cooling configuration significantly reduced the $CO_2$ content in the resultant product stream down to 6 ppmv, well below the product target of 50 ppmv. However, the comparable embodiment without the split feed cooling configuration was only able to lower the $CO_2$ content in the resultant product stream down to 698 ppmv. This is significantly above the product target of 50 ppmv $CO_2$ content.

Figure 4A:
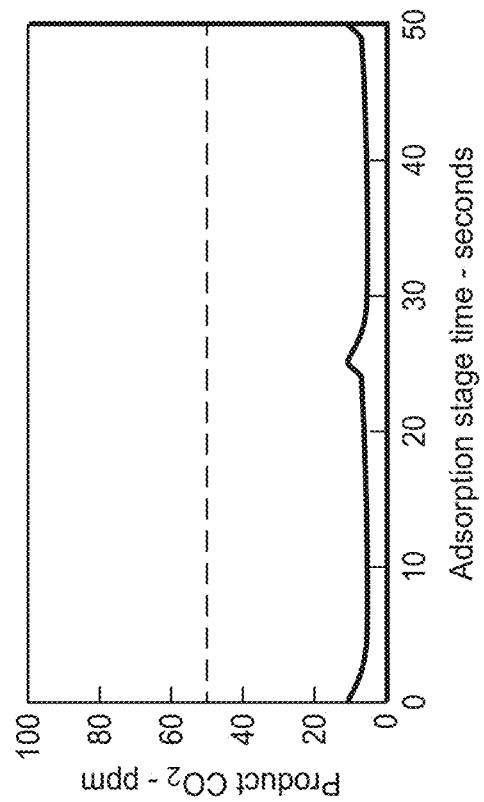
FIGS. 4A and 4B are an exemplary diagram showing $CO_2$ levels in the product gas as a function of time during an adsorption step for embodiments of disclosed swing adsorption system/processes.
Figure 4B:
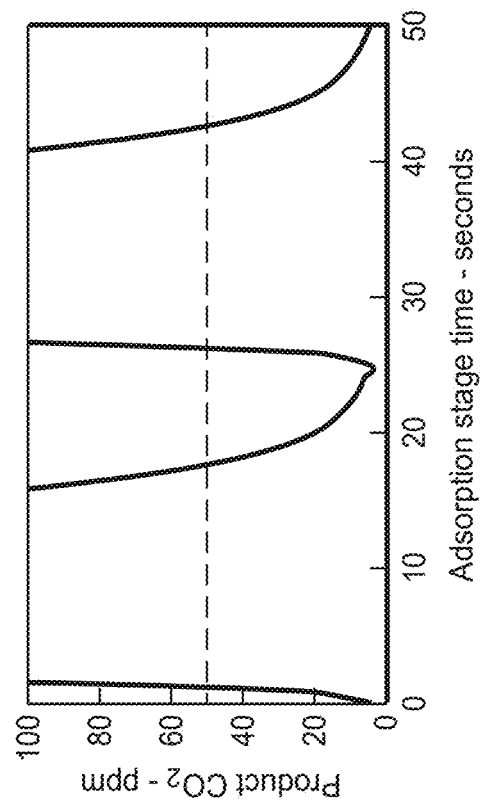

As can be seen in the simulation outputs of FIGS. 4A and 4B based on the output from the two simulations in this example, in the presently disclosed configurations, the product stream composition (shown in ppmv of contaminant $CO_2$ remaining in the product stream) over the time of two subsequent adsorption steps is illustrated. In FIGS. 4A and 4B, the solid line in each figure represents the actual $CO_2$ levels (in ppmv) in the product streams from the adsorption step as a function of time during the adsorption step, while the horizontal dotted line in each figure represents the maximum $CO_2$ target specification of 50 ppmv.

As can be seen in FIG. 4A, without the split feed cooling step, significant swings/spikes in the product composition were observed resulting in lower adsorption efficiencies and difficulties in monitoring and control of the product contaminant levels within specifications. As noted with respect to Table 2 above, this configuration resulted in $CO_2$ content in the resultant product stream of nearly 700 ppmv, significantly above the product target maximum of 50 ppmv.

As can be seen in FIG. 4B of the preferred presently disclosed configuration, not only was the contaminant level very low, but it remained low and relatively constant over the time of the adsorption steps. This not only leads to lower overall contaminants in the processed product stream, but also assists in controlling parameters of the overall swing adsorption process by making any changes in feed composition, step timing, temperatures or pressure easy to verify in the control of the product stream specifications. As noted with respect to Table 2 above, this configuration resulted in $CO_2$ content in the resultant product stream of about 6 ppmv, significantly below the product target maximum of 50 ppmv.

Figure 5:
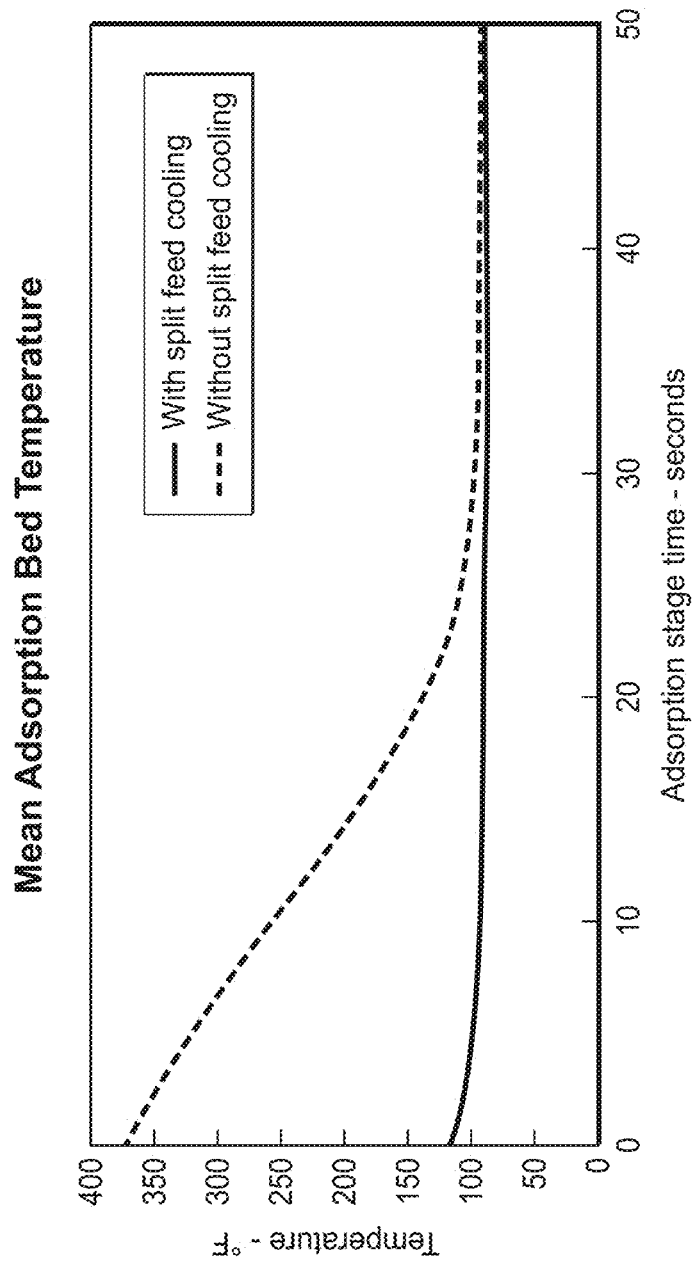
FIG. 5 is an exemplary diagram showing mean adsorption bed temperatures as a function of time during an adsorption step for embodiments of disclosed swing adsorption system/processes.

FIG. 5, which was taken from the same simulations cases as in FIGS. 4A and 4B, shows that that the embodiment without the split feed cooling stage resulted in significantly longer feed time to get the mean adsorption bed unit temperature down to approximately 100° F. which, in part, resulted in the severe product stream compositional fluctuations that are shown in FIG. 4A, whereas, an embodiment of the system configuration with the split feed cooling stage resulted in not only significantly lower mean adsorption bed temperatures, but also resulted in these temperature remaining relatively steady near 100° F. instead of fluctuating between approximately 375° F. and 100° F. as in the system configuration without the split feed cooling stage as shown in FIG. 4B.

In one or more embodiments, the active material in the adsorption bed units may include an adsorbent material supported on a non-adsorbent support. The adsorbent materials may include alumina, microporous zeolites, carbons, cationic zeolites, high silica zeolites, highly siliceous ordered mesoporous materials, sol gel materials, aluminum phosphorous and oxygen (ALPO) materials (microporous and mesoporous materials containing predominantly aluminum phosphorous and oxygen), silicon aluminum phosphorous and oxygen (SAPO) materials (microporous and mesoporous materials containing predominantly silicon aluminum phosphorous and oxygen), metal organic framework (MOF) materials (microporous and mesoporous materials comprised of a metal organic framework) and zeolitic imidazolate frameworks (ZIF) materials (microporous and mesoporous materials comprised of zeolitic imidazolate frameworks). Other materials include microporous and mesoporous sorbents functionalized with functional groups. Examples of functional groups include primary, secondary, tertiary amines and other non protogenic basic groups such as amidines, guanidines and biguanides. Preferred zeolites for the processes disclosed herein include 3A, 4A, 5A and RHO.

In one or more embodiments, when using RCTSA or an integrated RCPSA and RCTSA process, the total cycle times are typically less than 600 seconds, preferably less than 400 seconds, preferably less than 300 seconds, preferably less than 250 seconds, preferably less than 180 seconds, more preferably less than 90 seconds, and even more preferably less than 60 seconds. In other embodiment, the rapid cycle configuration may be operated at lower flow rates during startup mode as compared to normal operation mode, which may result in the cycle durations being longer than the cycle durations during normal operation mode. For example, the cycle duration may be extended to 1,000 seconds for some cycles.

In one or more embodiments, the present techniques may be susceptible to various modifications and alternative forms, such as the following embodiments as noted in paragraphs 1 to 30:

1. A process for removing contaminants from a gaseous feed stream with a swing adsorption process using a cyclic swing adsorption system comprising a plurality of adsorption bed units, the process comprising: a) performing a first adsorption step on a first adsorption bed unit, wherein the first adsorption step comprises passing a combined gaseous feed stream through the first adsorption bed unit to remove one or more contaminants and produce a product stream, while concurrently (or simultaneously) performing a first cooling step on a second adsorption bed unit; b) performing a second adsorption step on the first adsorption bed unit, wherein the second adsorption step comprises concurrently (or simultaneously) passing the combined gaseous feed stream concurrently (or simultaneously) through the first adsorption bed unit and the second adsorbent bed unit to remove the one or more contaminants and produce the product stream; c) interrupting the flow of the gaseous feed stream to the first adsorbent bed unit while retaining the flow of the combined gaseous feed stream to the second adsorbent bed unit; d) performing a cleaning purge step on the first adsorbent bed unit, wherein the cleaning purge step comprises passing a cleaning purge stream through the first adsorbent bed unit to remove one or more contaminants from the first adsorbent bed unit at a first temperature; e) interrupting the flow of the cleaning purge stream to the first adsorbent bed unit; f) performing a heating purge step on the first adsorbent bed unit, wherein the heating purge heating step comprises passing a heating purge stream through the first adsorbent bed unit to remove one or more contaminants from the first adsorbent bed unit at a first temperature; g) interrupting the flow of the heating purge stream to the first adsorbent bed unit; and h) performing a second cooling step on the first adsorbent bed unit, wherein the second cooling step comprises lessening the temperature of an adsorbent material in the first adsorbent bed unit by passing a first portion of a gaseous feed stream through the first adsorbent bed unit to produce a hot gaseous feed stream, wherein concurrently (or simultaneously) a second portion of the gaseous feed stream bypasses the first adsorbent bed unit, and wherein during the second cooling step the hot gaseous feed stream and the second portion of the gaseous feed stream are combined to form the combined gaseous feed stream.

2. The process of paragraph 1, wherein the first adsorbent bed unit and the second adsorbent bed unit are part of a swing adsorption system and the swing adsorption system comprises a number of adsorbent bed units (X) and the duration of a total cycle time for the swing adsorption process is the time for each step (Y) (or a cycle time interval (Y)) times the number of adsorbent bed units (X).

3. The process of paragraph 2, wherein the first adsorbent bed unit and the second adsorbent bed unit each go through two sequential back-to-back adsorption steps, such that a total duration that each the first adsorbent bed unit and the second adsorbent bed unit are subject to one or more adsorption steps is equal to a period of two times Y during the total cycle time for the swing adsorption process.

4. The process of paragraph 3, wherein the adsorption period of two times Y of the first adsorbent bed unit and the adsorption period of two times Y of the second adsorbent bed unit overlap, but the start of the adsorption period of the first adsorbent bed unit and the start of the adsorption period of the second adsorbent bed unit are at different times in the total cycle time of swing adsorption process.

5. The process of any one of the prior paragraphs, wherein the swing adsorption system comprises at least five adsorption bed units.

6. The process of paragraph 5, wherein at a point in the total cycle of the adsorption system at least one adsorption bed unit is subject to the cooling step, at least two adsorption bed units are subject to the adsorption step, at least one adsorption bed unit is subject to the cleaning purge step, and at least one adsorption bed unit is subject to the heating purge step.

7. The process of any one of the prior paragraphs, wherein the swing adsorption system comprises at least six adsorption bed units.

8. The process of paragraph 7, wherein at least one adsorbent bed unit is subject to a transition step.

9. The process of paragraph 8, wherein the transition step is selected from a blowdown step, a re-pressurization step, and an idling step.

10. The process of any one of the prior paragraphs, further comprising passing the at least a portion of the hot gaseous feed stream or at least a portion of the combined gaseous feed stream through a cooling unit to lower the temperature of the hot gaseous feed stream or the combined gaseous feed stream prior to passing the combined gaseous feed stream to the first adsorbent bed unit and the second adsorbent bed unit.

11. The process of any one of the prior paragraphs, further comprising repeating the steps a) to h) for at least one additional cycle in the swing adsorption process.

12. The process of any one of the prior paragraphs, wherein the total duration of all of the steps to complete a full cycle of the swing adsorption process is for a period greater than 1 second and less than 600 seconds.

13. The process of any one of the prior paragraphs, wherein the gaseous feed stream comprises greater than one volume percent hydrocarbons based on the total volume of the feed stream.

14. The process of any one of the prior paragraphs, wherein the gaseous feed stream comprises hydrocarbons and water ($H_2O$), wherein the $H_2O$ content of the gaseous feed stream is from about 10 ppmv to 2,000 ppmv of the gaseous feed stream; and the swing adsorption process is configured to lower the $H_2O$ in the product stream to less than 1 ppmv.

15. The process of any one of the prior paragraphs, wherein the gaseous feed stream comprises hydrocarbons and carbon dioxide ($CO_2$), wherein the $CO_2$ content of the gaseous feed stream is from about 200 ppmv to about 2% volume of the gaseous feed stream; and the swing adsorption process is configured to lower the $CO_2$ in the product stream to less than 50 ppmv.

16. The process of any one of paragraphs 13 to 15, further comprising passing the product stream to a downstream process selected from a liquefied natural gas (LNG) process that comprises an LNG process unit, and a cryogenic natural gas liquefaction (NGL) process having a NGL process unit.

17. A cyclical swing adsorption system comprising: a plurality of adsorbent bed units coupled to a plurality of manifolds, each of the adsorbent bed units is configured to pass different streams through the adsorbent bed unit between two or more steps in a swing adsorption cycle and each of the adsorbent bed units is configured to remove one or more contaminants from a feed stream to form a product stream and wherein each of the adsorbent bed units comprise: a housing; an adsorbent material disposed within the housing; a plurality of valves, wherein at least one of the plurality of valves is associated with one of the plurality of manifolds and is configured to manage fluid flow along a flow path extending between the respective manifold and the adsorbent material; and wherein the cyclical swing adsorption system is configured to concurrently (or simultaneously) pass a gaseous feed stream through at least two of the adsorbent bed units.

18. The cyclical swing adsorption system of paragraph 17, wherein the same stream is a gaseous feed stream containing hydrocarbons and at least one contaminant.

19. The cyclical swing adsorption system of paragraph 18, wherein the at least one contaminant is water (H2O) or carbon dioxide (CO2).

20. The cyclical swing adsorption system of paragraph 18 or 19, wherein the hydrocarbons comprise methane.
21. The cyclical swing adsorption system of paragraph 20, wherein the adsorbent material has an adsorption selectivity for the at least one contaminant over methane greater than 5.
22. The cyclical swing adsorption system of any one of paragraphs 17 to 21, wherein the adsorbent material is a zeolite.
23. The cyclical swing adsorption system of any one of paragraphs 17 to 22, wherein cyclical swing adsorption system comprises at least five adsorbent bed units.
24. The cyclical swing adsorption system of paragraph 23, wherein the plurality of manifolds comprises a cooling inlet manifold configured to pass at least a portion of the gaseous feed stream to the plurality of adsorbent bed units during cooling step, a feed manifold configured to pass at least a portion of the gaseous the feed stream to the plurality of adsorbent bed units during an adsorption step, a product manifold configured to pass the product stream from the plurality of adsorbent bed units during the adsorption step, a cleaning purge manifold configured to pass a cleaning purge stream to the plurality of adsorbent bed units during a cleaning purge step, and a heating purge manifold configured to pass a heating purge stream to the plurality of adsorbent bed units during a heating purge step.
25. The cyclical swing adsorption system of paragraph 24, wherein cyclical swing adsorption system further comprises a control unit for controlling the opening and closing the plurality of valves during each step in the swing adsorption cycle, the plurality of valves comprises at least one inlet valve for each adsorbent bed unit for controlling the flow of the gaseous feed stream from the feed manifold to the plurality of adsorbent bed units, and is configured to open the at least one inlet valve on two of the adsorbent bed units during the adsorption step.
26. The cyclical swing adsorption system of any one of paragraphs 24 and 25, wherein the feed manifold comprises a cooling unit.
27. The cyclical swing adsorption system of any one of paragraphs 24 to 26, wherein the plurality of manifolds comprises a cooling outlet manifold configured to pass at least a portion of the gaseous feed stream to the feed manifold.
28. The cyclical swing adsorption system of paragraph 27, wherein the cooling outlet manifold connects to the feed manifold at a point downstream of the cooling unit relative to the flow direction of the gaseous feed stream in the feed manifold.
29. The cyclical swing adsorption system of any one of paragraphs 17 to 28, further comprising a liquefied natural gas (LNG) process unit or a cryogenic natural gas liquefaction (NGL) process unit which is configured to receive the product stream.
30. The cyclical swing adsorption system of any one of paragraphs 17 to 29, wherein the plurality of valves comprise one or more poppet valves.

In view of the many possible embodiments to which the principles of the disclosed invention may be applied, it should be recognized that the illustrative embodiments are only preferred examples of the invention and should not be taken as limiting the scope of the invention.

What is claimed is:
1. A process for removing contaminants from a gaseous feed stream with a swing adsorption process using a cyclic swing adsorption system comprising a plurality of adsorption bed units, the process comprising:
   a) performing a first adsorption step on a first adsorption bed unit, wherein the first adsorption step comprises passing a combined gaseous feed stream through the first adsorption bed unit to remove one or more contaminants and produce a product stream, while simultaneously performing a first cooling step on a second adsorption bed unit;
   b) performing a second adsorption step on the first adsorption bed unit, wherein the second adsorption step comprises simultaneously passing the combined gaseous feed stream simultaneously through the first adsorption bed unit and the second adsorbent bed unit to remove the one or more contaminants and produce the product stream;
   c) interrupting the flow of the gaseous feed stream to the first adsorbent bed unit while retaining the flow of the combined gaseous feed stream to the second adsorbent bed unit;
   d) performing a cleaning purge step on the first adsorbent bed unit, wherein the cleaning purge step comprises passing a cleaning purge stream through the first adsorbent bed unit to remove one or more contaminants from the first adsorbent bed unit at a first temperature;
   e) interrupting the flow of the cleaning purge stream to the first adsorbent bed unit;
   f) performing a heating purge step on the first adsorbent bed unit, wherein the heating purge heating step comprises passing a heating purge stream through the first adsorbent bed unit to remove one or more contaminants from the first adsorbent bed unit at a second temperature;
   g) interrupting the flow of the heating purge stream to the first adsorbent bed unit; and
   h) performing a second cooling step on the first adsorbent bed unit, wherein the second cooling step comprises lessening the temperature of an adsorbent material in the first adsorbent bed unit by passing a first portion of a gaseous feed stream through the first adsorbent bed unit to produce a hot gaseous feed stream, wherein simultaneously a second portion of the gaseous feed stream bypasses the first adsorbent bed unit, and wherein during the second cooling step the hot gaseous feed stream and the second portion of the gaseous feed stream are combined to form the combined gaseous feed stream.

2. The process of claim 1, wherein the first adsorbent bed unit and the second adsorbent bed unit are part of a swing adsorption system and the swing adsorption system comprises a number of adsorbent bed units (X) and the duration of a total cycle time for the swing adsorption process is the time for a cycle time interval (Y) times the number of adsorbent bed units (X).

3. The process of claim 2, wherein the first adsorbent bed unit and the second adsorbent bed unit each go through two sequential back-to-back adsorption steps, such that a total duration that each the first adsorbent bed unit and the second adsorbent bed unit are subject to one or more adsorption steps is equal to a period of two times Y during the total cycle time for the swing adsorption process.

4. The process of claim 3, wherein the adsorption period of two times Y of the first adsorbent bed unit and the adsorption period of two times Y of the second adsorbent bed unit overlap, but the start of the adsorption period of the first adsorbent bed unit and the start of the adsorption period of the second adsorbent bed unit are at different times in the total cycle time of swing adsorption process.

5. The process of claim 1, wherein the swing adsorption system comprises at least five adsorption bed units.

6. The process of claim 5, wherein at a point in a total cycle of the adsorption system at least one adsorption bed unit is subject to the first cooling step or the second cooling step, at least two adsorption bed units are subject to the adsorption step, at least one adsorption bed unit is subject to the cleaning purge step, and at least one adsorption bed unit is subject to the heating purge step.

7. The process of claim 1, wherein the swing adsorption system comprises at least six adsorption bed units.

8. The process of claim 7, wherein at least one adsorbent bed unit is subject to a transition step.

9. The process of claim 8, wherein the transition step is selected from a blowdown step, a re-pressurization step, and an idling step.

10. The process of claim 1, further comprising passing the at least a portion of the hot gaseous feed stream or at least a portion of the combined gaseous feed stream through a cooling unit to lower the temperature of the hot gaseous feed stream or the combined gaseous feed stream prior to passing the combined gaseous feed stream to the first adsorbent bed unit and the second adsorbent bed unit.

11. The process of claim 1, further comprising repeating the steps a) to h) for at least one additional cycle in the swing adsorption process.

12. The process of claim 1, wherein the total duration of all of the steps to complete a full cycle of the swing adsorption process is for a period greater than 1 second and less than 600 seconds.

13. The process of claim 1, wherein the gaseous feed stream comprises greater than one volume percent hydrocarbons based on the total volume of the feed stream.

14. The process of claim 1, wherein the gaseous feed stream comprises hydrocarbons and water ($H_2O$), wherein the $H_2O$ content of the gaseous feed stream is from about 10 ppmv to 2,000 ppmv of the gaseous feed stream; and the swing adsorption process is configured to lower the $H_2O$ in the product stream to less than 1 ppmv.

15. The process of claim 1, wherein the gaseous feed stream comprises hydrocarbons and carbon dioxide ($CO_2$), wherein the $CO_2$ content of the gaseous feed stream is from about 200 ppmv to about 2% volume of the gaseous feed stream; and the swing adsorption process is configured to lower the $CO_2$ in the product stream to less than 50 ppmv.

16. The process of claim 13, further comprising passing the product stream to a downstream process selected from a liquefied natural gas (LNG) process that comprises an LNG process unit, and a cryogenic natural gas liquefaction (NGL) process having a NGL process unit.

17. A cyclical swing adsorption system comprising:
a plurality of adsorbent bed units coupled to a plurality of manifolds, each of the adsorbent bed units is configured to pass different streams through the adsorbent bed unit between two or more steps in a swing adsorption cycle and each of the adsorbent bed units is configured to remove one or more contaminants from a feed stream to form a product stream and wherein each of the adsorbent bed units comprise:
a housing;
an adsorbent material disposed within the housing;
a plurality of valves, wherein at least one of the plurality of valves is associated with one of the plurality of manifolds and is configured to manage fluid flow along a flow path extending between the respective manifold and the adsorbent material; and
wherein the cyclical swing adsorption system is configured to simultaneously pass a combined gaseous feed stream through at least two of the adsorbent bed units, wherein a cooling step is performed on a first bed unit by passing a first portion of the feed stream to produce a hot gaseous feed stream while simultaneously passing a second portion of the feed stream to bypass the first bed unit such that the hot gaseous feed stream and the second portion are combined to form the combined gaseous feed stream.

18. The cyclical swing adsorption system of claim 17, wherein a same stream is a gaseous feed stream containing hydrocarbons and at least one contaminant.

19. The cyclical swing adsorption system of claim 18, wherein the at least one contaminant is water ($H_2O$) or carbon dioxide ($CO_2$).

20. The cyclical swing adsorption system of claim 18, wherein the hydrocarbons comprise methane.

\* \* \* \* \*